(12) United States Patent
Hoffmann

(10) Patent No.: US 11,985,535 B2
(45) Date of Patent: May 14, 2024

(54) COMPLETE DYNAMIC POLICY CONTROL IN COMMUNICATION SYSTEM COMPRISING USER PLANE NETWORK FUNCTIONS AND CONTROL PLANE NETWORK FUNCTIONS

(71) Applicant: NOKIA TECHNOLOGIES OY, Espoo (FI)

(72) Inventor: Klaus Hoffmann, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/973,228

(22) PCT Filed: Jun. 11, 2018

(86) PCT No.: PCT/EP2018/065285
§ 371 (c)(1),
(2) Date: Dec. 8, 2020

(87) PCT Pub. No.: WO2019/238202
PCT Pub. Date: Dec. 19, 2019

(65) Prior Publication Data
US 2021/0243640 A1      Aug. 5, 2021

(51) Int. Cl.
*H04W 28/02* (2009.01)
*H04L 41/0816* (2022.01)
(Continued)

(52) U.S. Cl.
CPC ..... *H04W 28/0268* (2013.01); *H04L 41/0816* (2013.01); *H04L 47/18* (2013.01); *H04L 47/20* (2013.01); *H04L 65/80* (2013.01)

(58) Field of Classification Search
None
See application file for complete search history.

(56) References Cited

U.S. PATENT DOCUMENTS

2017/0317894 A1* 11/2017 Dao ................... H04L 41/5009
2019/0182875 A1*  6/2019 Talebi Fard ............ H04W 8/18

FOREIGN PATENT DOCUMENTS

WO    WO-2018058618 A1 *  4/2018
WO    WO-2018086674 A1 *  5/2018

OTHER PUBLICATIONS

International Search Report and Written Opinion dated Feb. 13, 2019 corresponding to International Patent Application No. PCT/EP2018/065285.

(Continued)

*Primary Examiner* — Christine T Duong
(74) *Attorney, Agent, or Firm* — SQUIRE PATTON BOGGS (US) LLP

(57) ABSTRACT

On a control plane or on a user plane of a communication system, a parameter of service quality for a session between a user equipment and a data network is received (S2B01), the parameter is evaluated (S2B02) for a change of the parameter, and based on the evaluation (S2B03), the change of the parameter is reported (S2B04) to the control plane of the communication system. On the control plane, the parameter is received (S2A01). The parameter is evaluated (S2A02), and based on the evaluation (S2A03), re-location of a user plane network function is initiated and/or a new user plane network function is inserted (S2A04).

13 Claims, 6 Drawing Sheets

(51) Int. Cl.
*H04L 47/10* (2022.01)
*H04L 47/20* (2022.01)
*H04L 65/80* (2022.01)

(56) References Cited

OTHER PUBLICATIONS

3GPP TR 23.739 V1.0.0 (Jun. 2018), Technical Report, 3rd Generation Partnership Project; Technical Specification Group Services and System Aspects; Study on enhancement of EPC for low latency communication including device mobility (Release 16), Jun. 7, 2018, pp. 1-27, XP051451626.
CATT et al: "23.501: QoS flow binding for reflective QoS," 3GPP Draft; S2-174839, SA WG2 Meeting #122, San Jose el Cabo, Mexico, Jul. 3, 2017, XP051309898.
Communication pursuant to Article 94(3) EPC dated Mar. 16, 2022 corresponding to European Patent Application No. 18731778.9.
European Office Action issued in corresponding European Patent Application No. 18 731 778.9-1213 dated Jan. 23, 2023.

* cited by examiner

COMPLETE DYNAMIC POLICY CONTROL IN COMMUNICATION SYSTEM COMPRISING USER PLANE NETWORK FUNCTIONS AND CONTROL PLANE NETWORK FUNCTIONS

TECHNICAL FIELD

Some embodiments relate to complete dynamic policy control in a communication system comprising user plane network functions and control plane network functions, e.g. a communication system complying with a fourth generation (4G) and/or fifth generation (5G) system.

BACKGROUND

Communication systems with user plane network functions and control plane network functions improve flexibility in network deployment and network efficiency. A quality of service (QoS) model adopted in such communication systems provides an end-to-end QoS mechanism to enable differentiated data services.

SUMMARY

It is desired that, based on operator policy, a communication system such as the 5G system allows for real-time, dynamic, secure and limited interaction with QoS and policy framework for modification of the QoS and policy framework by authorized users and context aware network functionality.

A prior art communication system does not consider the case that a QoS parameter comprising at least one of latency/delay, jitter and bit error rate (BER)/packet error rate (PER) may be changed.

A prior art procedure may work well for cases where the latency QoS parameter is kept, but/and for instance the bitrate is upgraded or downgraded. The prior art communication system does not allow for the downgrade or upgrade to higher latency or lower latency. For example, the prior art communication systems do not perform re-selection of user plane functions (UPFs) in order to adhere to the modified latency parameter in the QoS. That means the new latency is not enforced.

Some embodiments aim at overcoming the above-described problem. Some embodiments provide for apparatuses, methods and computer program products such as non-transitory computer-readable media, which reconfigure a communication system in accordance with a parameter of service quality comprising at least one of latency/delay, jitter and bit/packet error rate in the communication system.

In the following embodiments will be described with reference to the accompanying drawings.

DESCRIPTION OF EMBODIMENTS

According to some embodiments, a parameter of service quality (included e.g. in QoS information) is evaluated by a control plane of a communication system to detect that the parameter for a session in the communication network has been changed.

According to some embodiments, the parameter comprises at least one of delay, latency, jitter, single network slice selection assistance information (S-NSSAI), any other delay information, and bit/packet error rate.

According to some embodiments, the control plane comprises at least one of the following control plane network functions: an evolved/5G NodeB control plane (e/gNB-C), radio access network control plane (RAN-C), access and mobility management function (AMF), mobility management entity (MME), session management function (SMF), packet gateway control plane (PGW-C), serving gateway control plane (SGW-C), policy control function (PCF) and policy and charging control function (PCRF).

According to some embodiments, the session comprises a packet data unit (PDU) session in 3G, 4G, 5G, etc.

According to some embodiments, the control plane intercepts QoS information and stores (locally or in a remote database) at least an actual budget with respect to the parameter of service quality (e.g. an actual packet delay budget (PDB)) as for instance received during session establishment procedure or a PDU session modification procedure. Upon receipt of new QoS information during e.g. a modification message, a value of the parameter included in the QoS information is compared with the stored information. In case of a change of the parameter (in case of a change of the parameter value), the control plane initiates re-location of a user plane network function.

According to some embodiments, the user plane network function comprises at least one of a user plane function (UPF), a serving gateway user plane (SGW-U), a packet gateway user plane (PGW-U), an evolved/5G NodeB user plane (e/gNB-U), and radio access network user plane (RAN-U).

Figure 1:
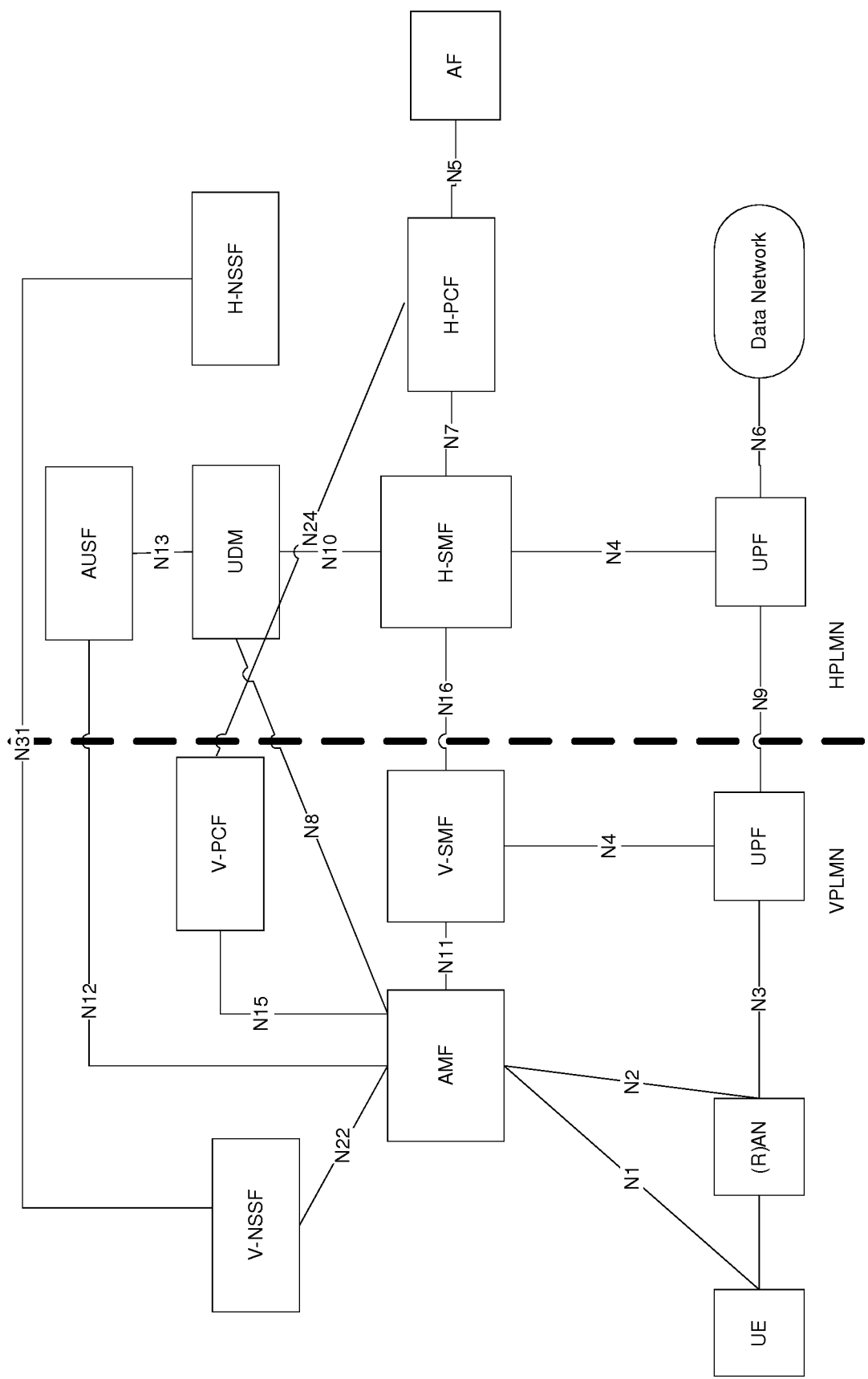
FIG. 1 shows a schematic diagram illustrating a home routed scenario in a roaming 5G system architecture.

FIG. 1 shows a schematic diagram illustrating a home routed scenario in a roaming 5G system architecture in which some embodiments are implementable.

A user equipment (UE) is routed in a network (visited public land mobile network (VPLMN)) by its home network (home public land mobile network (HPLMN)). The UE which may have a session with a data network in the HPLMN is connected to the VPLMN via a (radio) access network ((R)AN) of the VPLMN and may be coupled to an AMF of the VPLMN via N1 interface. The AN is connected to the AMF of the VPLMN via N2 interface and to a UPF of the VPLMN via N3 interface. The UPF of the VPLMN is connected to a V-SMF via N4 interface.

A UPF of the HPLMN and an H-SMF are connected via N4 interface. An AF of the HPLMN is connected to an H-PCF via N5 interface. The data network of the HPLMN is connected to the UPF of the HPLMN via N6 interface. The H-PCF is connected to the H-SMF via N7 interface. An application (APP) may reside in a data center (DC) in the data network (DN).

The AMF of the VPLMN is connected to a unified data management (UDM) of the HPLMN via N8 interface.

The UPF of the HPLMN is connected to the UPF of the VPLMN via N9 interface. The H-SMF is connected to the UDM via N10 interface.

The AMF and the V-SMF are connected via D11 interface. The AMF and an authentication server function (AUSF) are connected via N12 interface.

The AUSF and the UDM are connected via N13 interface. The AMF and a V-PCF are connected via N15 interface. The V-SMF and the H-SMF are connected via N16 interface. the AMF and a V-NSSF are connected via N22 interface.

The H-PCF and the V-PCF are connected via N24 interface. And the V-NSSF and an H-NSSF are connected via N31 interface.

Figure 2B:
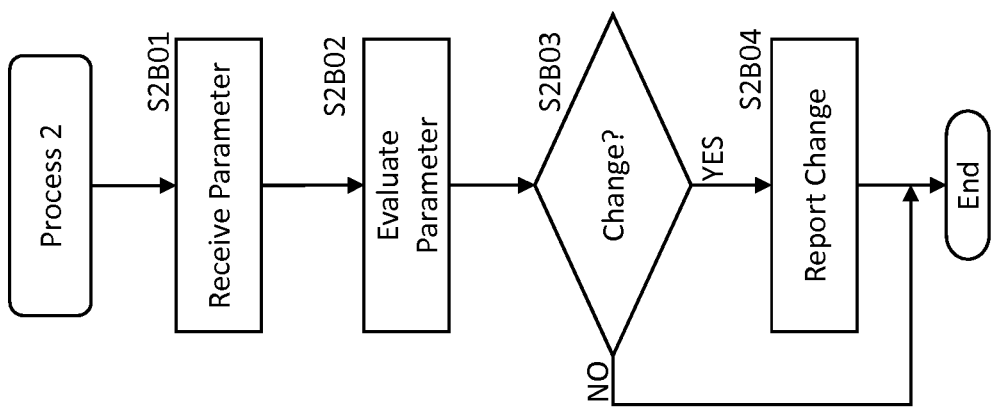
FIGS. 2A and 2B show flowcharts illustrating processes according to some embodiments.
Figure 2A:
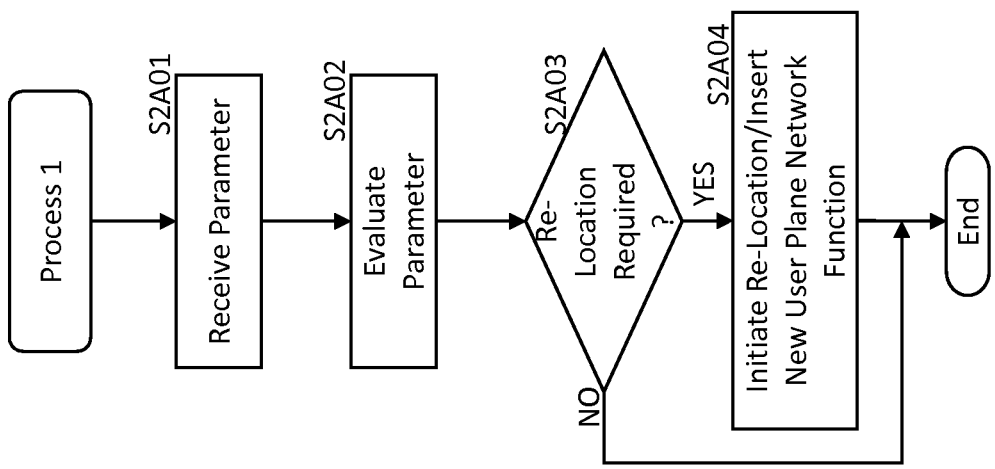

Now reference is made to FIG. 2A showing a flowchart illustrating a process 1 according to some embodiments. Process 1 is executed on the control plane of the communication system e.g. by at least one of the following control plane network functions: e/gNB-C, RAN-C, AMF, MME, SMF, PGW-C and SGW-C.

In step S2A01, a parameter of service quality for a session between a user equipment (UE) and a data network is received. According to some embodiments, the parameter of service quality comprises at least one of latency, jitter and packet error rate.

In step S2A02, the parameter is evaluated. In step S2A03 it is determined based on the evaluation, whether or not re-location of a user plane network function is required e.g. for enforcing the parameter in the communication network. If Yes in step S2A03, the process proceeds to step S2A04 in which re-location is initiated. Alternatively or in addition, in step S2A04 a new user plane network function is inserted e.g. for enforcing the parameter in the communication network. Then process 1 ends. If No in step S2A03, process 1 ends.

According to a first example embodiment, process 1 is executed by an SMF (or similarly SGW-C, PGW-C) and the SMF initiates re-location by re-selecting at least one user plane network function (e.g. by selecting at least one new user plane network function). For example, the user plane network function comprises a UPF.

It is to be noted that in this disclosure, content relating to "re-location" and "re-selection" also covers inserting a new user plane function. According to the first example embodiment, upon receipt of a QoS modification with changed parameter of service quality issued by a policy control function (PCF) sent to the SMF, in a non-roaming case it may be sufficient that the SMF decides on its own to re-select the UPF to match at least one of new latency/delay, jitter and packet error rate requirements as indicated by the changed parameter of service quality.

However, in case there are possibly multiple UPFs involved already it may not always be possible that one SMF alone is able to re-select the UPF alone.

According to a second example embodiment, process 1 is executed by SMF (or similarly SGW-C, PGW-C) and/or AMF (or similarly MME).

According to the second example embodiment, for instance, upon receipt of the QoS modification with changed parameter of service quality issued by the PCF (e.g. H-PCF shown in FIG. 1) and sent to the SMF (e.g. H-SMF shown in FIG. 1), in the home routed roaming case the SMF may let the AMF perform the re-selection of SMF(s). The AMF may instruct the new/old SMF(s) then to perform the re-selection of the UPF(s), as will be described in more detail with respect to a third example implementation illustrated in FIG. 5.

For the home routed roaming case it is desired that the visited/home (V/H) -SMFs do not re-select the UPF(s), however, in a non-roaming case it is desired that the SMF re-selects the UPF(s), if possible.

According to a third example embodiment to be described in more detail below with respect to the third example implementation illustrated in FIG. 5, process 1 is executed by the AMF (or similarly MME).

In case the communication system comprises multiple potential SMFs with different responsible UPFs for different SMFs, even in the non-roaming case the SMF may not be able to re-select the appropriate UPF and the AMF needs to be consulted for re-selection of the appropriate SMF and re-selection of appropriate UPF.

According to the third example embodiment, the AMF always checks the QoS information and performs the re-selection of UPFs/SMFs. For this purpose, for example, the AMF postpones a triggered modification with a rejection message towards the V-SMF and H-SMF and starts the re-location of the SMFs and UPFs. Alternatively, also a piggybacking of a re-location message with the modification response may be performed, as will be described in more detail below with respect to the third example implementation.

According to a fourth example embodiment, the PCF decides whether to inform AMF (or similarly MME) or SMF about the changed parameter of service quality via a message, thereby invoking the AMF or SMF to execute process 1 based on the content of the changed parameter of service quality.

FIG. 2B shows a flowchart illustrating process 2 performed on the control plane according to some embodiments, e.g. by the PCF according to the fourth example embodiment. In step S2B01, a parameter of service quality for a session between a user equipment (UE) and a data network is received on the control plane of the communication system, e.g. the AF. In step S2B02, the parameter is evaluated for a change of the parameter. In step S2B03 it is checked whether or not the parameter has been changed, and if YES, in step S2B04 the change of the parameter is reported to the control plane of the communication system, e.g. the H-SMF or the AMF via the V-PCF shown in FIG. 1. Then process 2 ends. If NO in step S2B03, process 2 ends.

The fourth example embodiment will be described in more detail below with respect to a second example implementation illustrated in FIG. 4.

Further, according to the fourth example embodiment, the N15 interface (interface between PCF and AMF/MME) is modified/augmented such that the PCF informs (only) the AMF/MME about the parameter of service quality directly, if the parameter has been changed in QoS information issued e.g. by an application function (AF). Since the AMF/MME will re-select SMF(s)/UPF(s), the involved SMFs and UPFs will be informed about the parameter content as part of the SMF and/or UPF re-selection procedure.

If the parameter of service quality has not been changed in the QoS information, then the PCF forwards the parameter via the N7 interface (or Gx interface respectively) to the SMF/PGW-C/SGW-C directly as of today.

Alternatively, the PCF may be configured to always forward the QoS information to the AMF for further processing. In this case, the interface between PCF and SMF may not be needed anymore. This is because even if the QoS information does not require a re-location of the user plane, the AMF is to be informed about the new QoS information. That means that the SMF is required to signal the QoS information to the AMF anyhow. Considering this, the AMF may be informed directly by the PCF, and the AMF is to decide whether to re-locate or let re-locate the UPF and/or to inform the SMF and UPF about the new QoS information, only if needed.

According to a fifth example embodiment, in case reflective QoS actively invoked by the network or by an application in the data center of the data network is applied in the third example embodiment described above, where also possibly an additional UPF is between the UPF and a gNB (or (R)AN shown in FIG. 1), an SMF of the remote UPF (far away from the gNB/(R)AN) is not allowed to use reflective QoS via the user plane for change of the parameter of service quality.

Alternatively, according to a sixth example embodiment, if the reflective QoS actively invoked by the network or the application via the user plane is allowed to be performed, then the N4 interface (as e.g. shown in FIG. 1) is augmented such that the SMF of the UPF close to the gNB is able to instruct the UPF to notify the SMF about the change of the parameter of service quality in the reflective QoS sent in the user plane.

Then either the SMF locally relocates the UPF or the SMF informs the AMF to recalculate and re-locate the SMF and the new SMF re-locates the UPF.

Alternatively, instead of the UPF notifying the SMF, the gNB evaluates the parameter of service quality of the reflective QoS and if the parameter has been changed, the gNB informs the AMF to trigger the re-location of the UPF in accordance with the new requirement indicated by the changed parameter.

According to a seventh example embodiment, in case reflective QoS actively invoked by the network or the application is applied in the fourth example embodiment described above, where also possibly an additional UPF is between the UPF and the gNB, the PCF informs directly the AMF for the re-selection of SMFs and UPFs. The AMF invokes the reflective QoS procedure at the SMF.

For example, if the UPF detects a change of the QoS information, then the AMF/SMF is informed about the change. Then the AMF/SMF may or may not invoke the relocation of that UPF which reported the change of the QoS information. Of course due to topology and/or policy the AMF/SMF may keep the reporting UPF, but may relocate any other UPF or insert even a new UPF as needed for the service.

It is to be noted that the reporting of a changed QoS information not necessarily only leads to the change/re-location/re-selection of the reporting UPF, but possibly only or in addition leads to a re-location of another UPF, or even only or in addition leads to insertion of another new UPF.

According to an example implementation, the interface N4 is augmented such that the SMF can instruct the UPF to send the reflective QoS information. For example, the SMF signals an indication to the UPF to send the reflective QoS in the user plane. Additionally, the SMF may signal the direction towards which the reflective QoS is to be sent in the user plane, e.g. in uplink or downlink direction.

Process 2 shown in FIG. 2B is performed on the user plane in case reflective QoS is actively invoked e.g. by the UE according to some embodiments. In this case, QoS information carries payload/in-band information about the parameter of service quality. Process 2 is performed on the user plane of the communication system, e.g. by the UPF of the VPLMN shown in FIG. 1.

In step S2B01, a parameter of service quality for a session between a user equipment (UE) and a data network is received on the user plane of the communication system. In step S2B02, the parameter is evaluated for a change of the parameter. In step S2B03 it is checked whether or not the parameter has been changed, and if YES, in step S2B04 the change of the parameter is reported to a control plane of the communication system, e.g. the V-SMF shown in FIG. 1. Then process 2 ends. If NO in step S2B03, process 2 ends.

According to an eighth example embodiment, the SMF instructs the UPF during session establishment to report any change of the latency/delay, jitter and/or PER/BER parameter in the QoS information. Upon receipt of such changed parameter, the UPF does not forward related packets and reports the whole QoS information to the SMF. The SMF upon receipt of such indication may decide to re-locate the UPF or may inform the AMF about the change of the QoS. In the latter case the AMF triggers the re-location of the SMF and UPF like in the fourth example embodiment.

Alternatively, the UPF may reject such reflective QoS if instructed by the SMF e.g. based on policy considerations. According to an example implementation, the interface N4 is augmented such that the SMF can instruct the UPF to reject the received reflective QoS information. For example, the SMF signals an indication to the UPF to send the reflective QoS rejection in the user plane.

Furthermore, process 2 may be performed by the user plane of the gNB which then reports the parameter change to the control plane of the gNB. In turn, the eNB may inform the AMF which may recalculate the SMF and UPF.

According to an alternative example embodiment, the UE invokes the change of the QoS parameter via the control plane, e.g. interface N1.

The eighth example embodiment will be described in more detail below by referring to FIG. 3.

Figure 3:
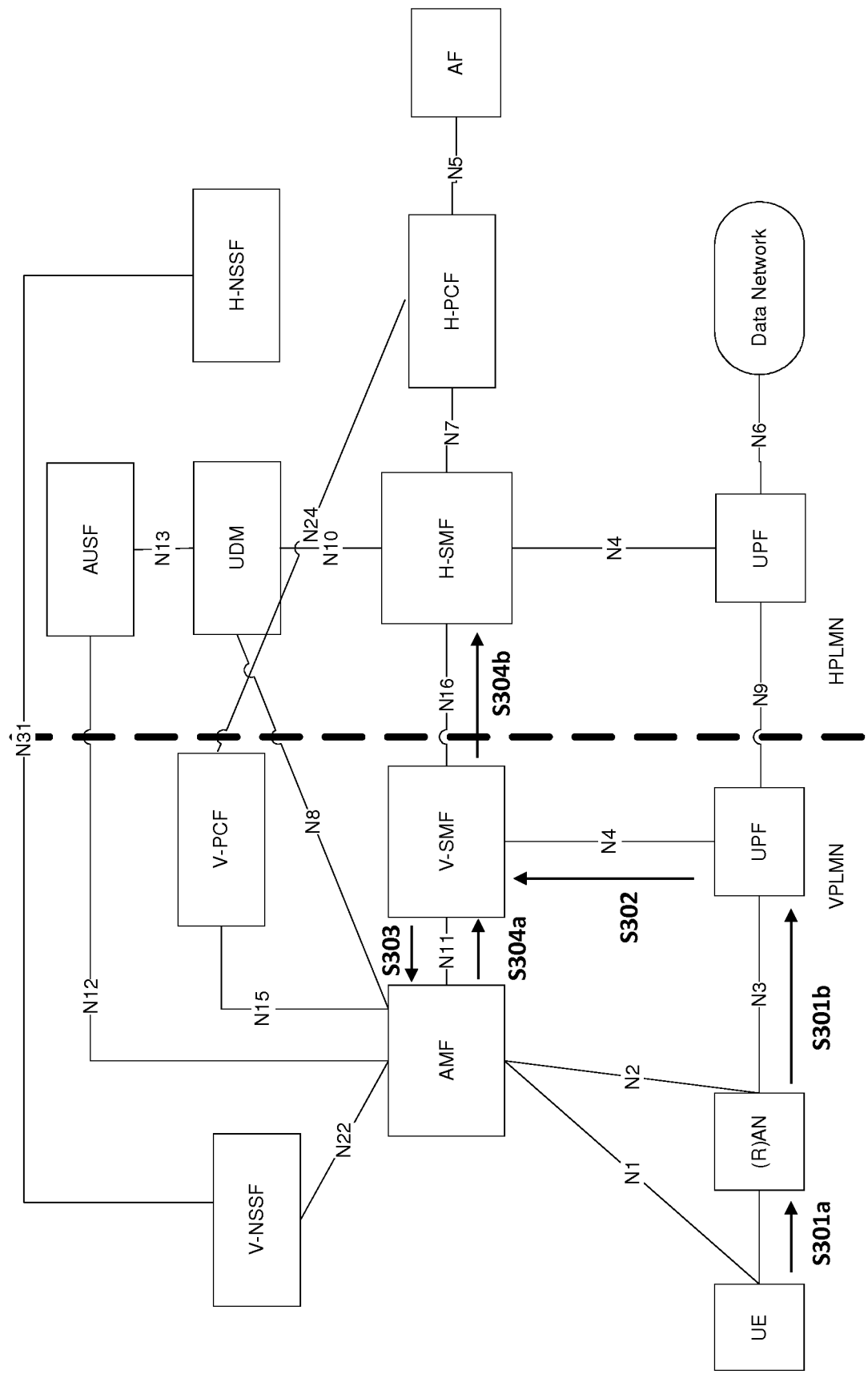
FIG. 3 shows a schematic diagram illustrating reflective QoS actively invoked according to a first example implementation.

FIG. 3 shows a schematic diagram illustrating reflective QoS actively invoked according to a first example implementation. In FIG. 3, the illustrated reference points correspond to those described with respect to FIGS. 1, and their description will not be repeated here.

Reflective QoS allows to signal the new QoS (new parameter of service quality, changed parameter of service quality) in-band in the user plane.

According to the first example implementation, the SMF (V-SMF) via N4 or the control plane of the gNB (in case the gNB is separated into control plane part and user plane part) instructs the UPF or the user plane part of the gNB (gNB-UP) to evaluate the latency/delay/jitter/PER/BER parameter of the QoS/QCi in the user plane for a change.

In steps S301*a* and S301*b*, the UE invokes reflective QoS by issuing a reflective QoS request to the (R)AN which according to FIG. 3 forwards the request to the UPF. If a change of the parameter in the QoS information is detected, in step S302 the UPF notifies the V-SMF of the change and an application ID. Alternatively or in addition, the user plane of the gNB notifies the control plane of the gNB of the change and the application ID.

Then either the V-SMF in step S303 or the control plane of the gNB informs the AMF about the parameter change. Then the AMF takes the new parameter value into account e.g. to re-locate the UPF such that the new QoS requirements are met, by issuing an SMF/UPF re-selection request to the V-SMF in step S304*a*. The V-SMF forwards the request to the H-SMF in step S304*b*.

In case of roaming scenarios it is beneficial that the AMF with an overall view of the VPLMN and the HPLMN selects the UPFs in HPLMN and VPLMN.

In case of non-roaming scenarios it may be sufficient that the AMF keeps the existing SMF or re-selects a new SMF depending on how the new value of the parameter of the QoS/QCI differs from the old value of the parameter, and leaves it up to the old/new SMF to re-select the appropriate UPF.

Figure 4:
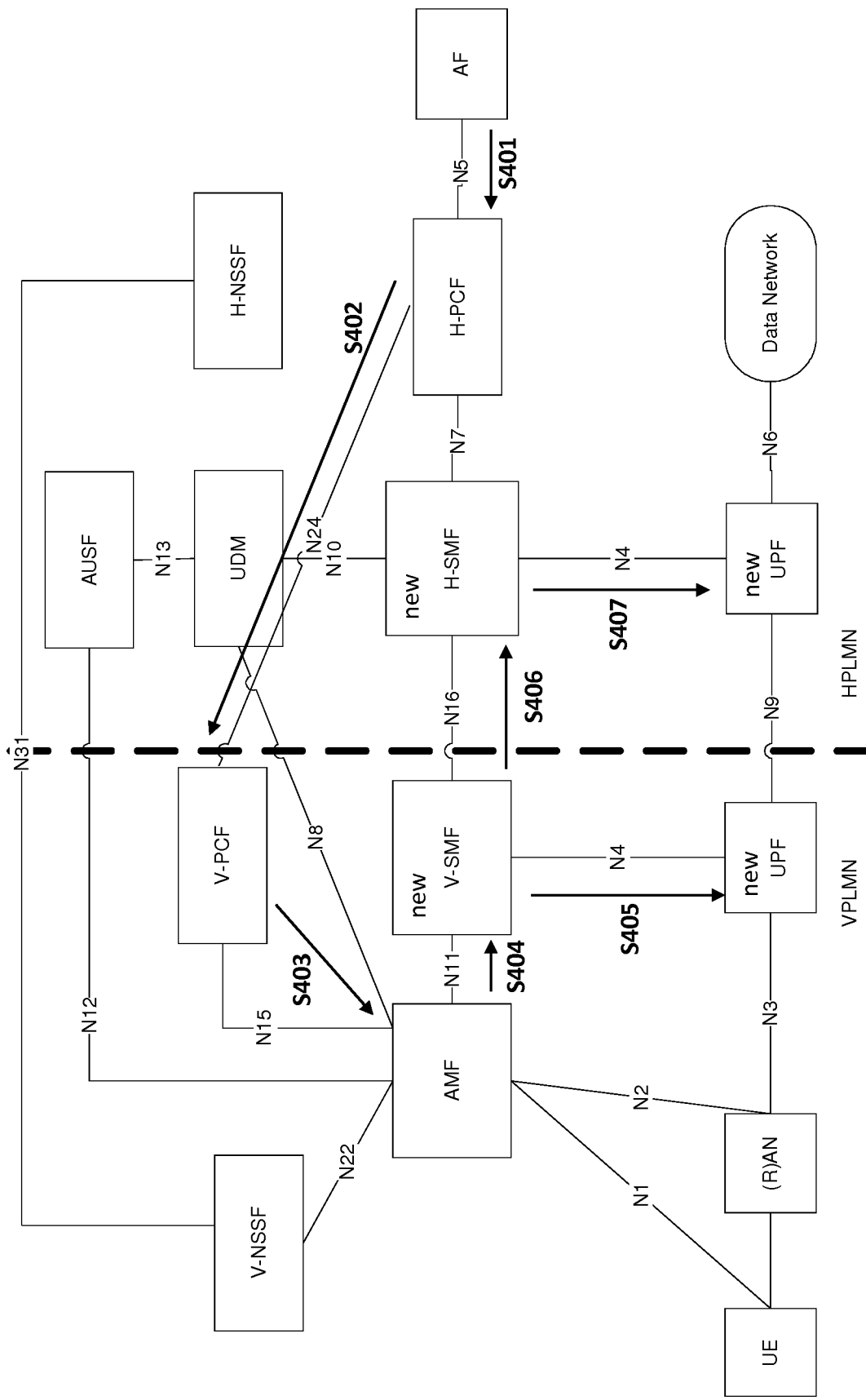
FIG. 4 shows a schematic diagram illustrating re-location in a home routed scenario in a roaming 5G system architecture according to a second example implementation.

FIG. 4 shows a schematic diagram illustrating re-location in a home routed scenario in a roaming 5G system architecture according to a second example implementation. The second example implementation comprises an implementation of the fourth example embodiment described above. In FIG. 4, the illustrated reference points correspond to those described with respect to FIG. 1, and their description will not be repeated here.

In the second example implementation, the PCF (H-PCF) decides whether to inform the AMF or the SMF (H-SMF) in case of the parameter of service quality is changed e.g. by the AF.

In step S401, the AF issues a request to change the QoS delay/latency/jitter/PER/BER parameter. In the present case, the PCF decides to invoke the AMF directly. In particular, upon receipt of the AF request at the H-PCF, the H-PCF detects that the parameter of service quality has been changed and therefore invokes the AMF via the V-PCF by issuing a non-session management policy modification message to the PCF (V-PCF) via the N10 interface in step S402 which message is forwarded by the V-PCF to the AMF in step S403 via the N15 interface.

The AMF checks whether there is a need to re-select SMF and UPF due to the change of the parameter in the QoS information. If there is a need, the AMF re-calculates the new locations of the SMFs and UPFs and initiates the re-location of the SMFs and UPFs if needed, by issuing a re-selection request to new V/H-SMFs and new UPFs via the new V/H-SMFs in steps S404 to S407.

Figure 5:
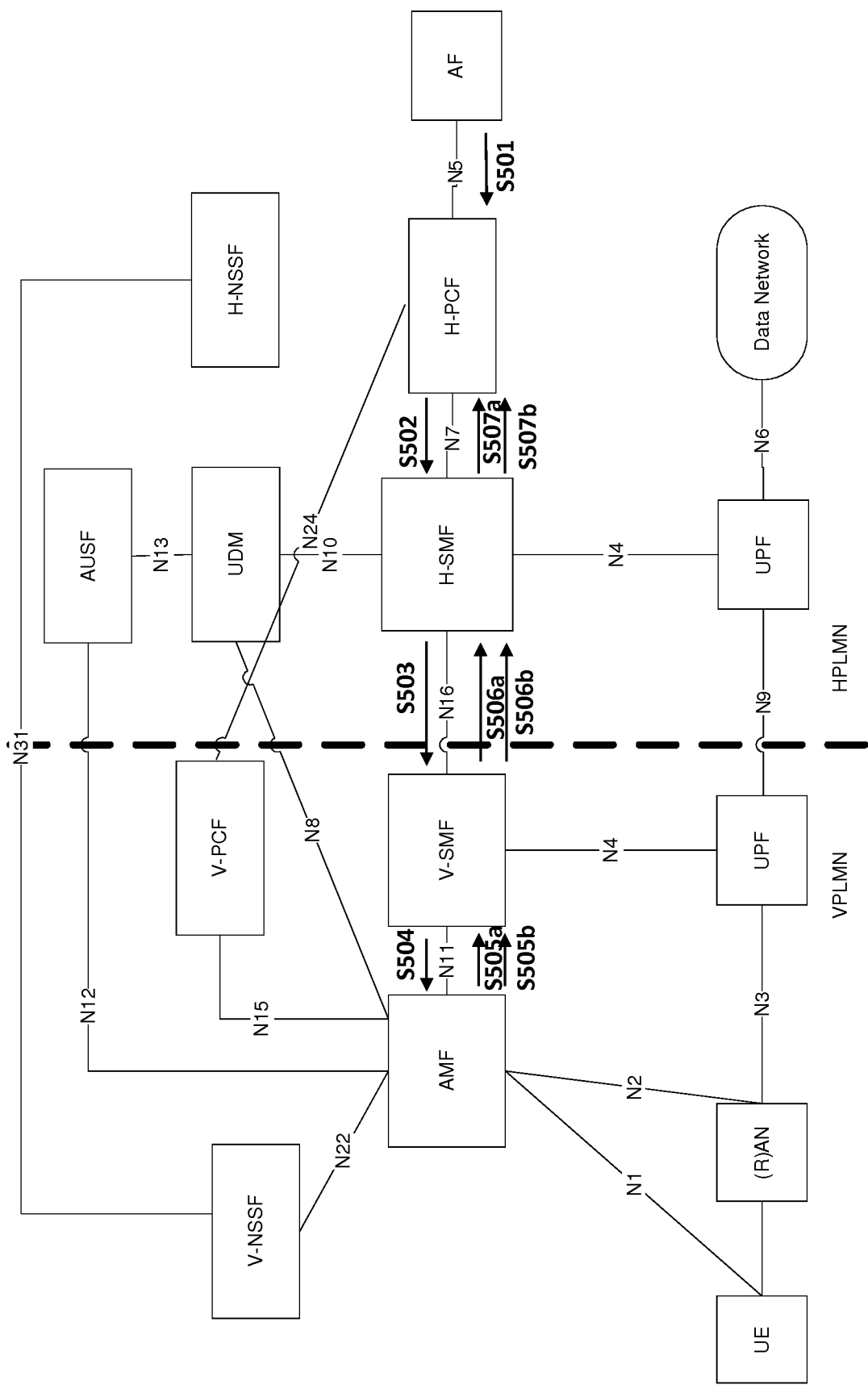
FIG. 5 shows a schematic diagram illustrating re-location in a home routed scenario in a roaming 5G system architecture according to a third example implementation.

FIG. 5 shows a schematic diagram illustrating re-location in a home routed scenario in a roaming 5G system architecture according to a third example implementation. The third example implementation comprises an implementation of the third example embodiment described above. In FIG. 5, the illustrated reference points correspond to those described with respect to FIG. 1, and their description will not be repeated here.

In the third example implementation, the AMF is responsible for the SMF and UPF re-selection if needed due to the changed parameter of service quality. As shown in FIG. 5, in step S501 the AF issues a request to change the QoS delay parameter.

Upon receipt of the AF request at the PCF, the PCF invokes a session management policy modification towards the H-SMF/SMF in step S502. In step S503, the H-SMF sends a session update request towards the V-SMF. In step S504, the V-SMF forwards this information via a communication N1 N2 transfer message to the AMF. The AMF checks whether there is a need to re-select SMF and UPF due to the change of the parameter in the QoS information. In case there is a need, the AMF re-calculates the new locations of the SMFs and UPFs and initiates the re-location of the SMFs and UPFs if needed by sending modification response and re-selection request in one message towards the H-PCF via the V-SMF and the H-SMF in steps S505a, S506a and S507a. Alternatively, the modification response and re-selection request are sent separately, i.e. the modification response is sent in steps S505a, S506a and S507a, and the re-selection request is sent in steps S505b, S506b and S507b.

Figure 6:
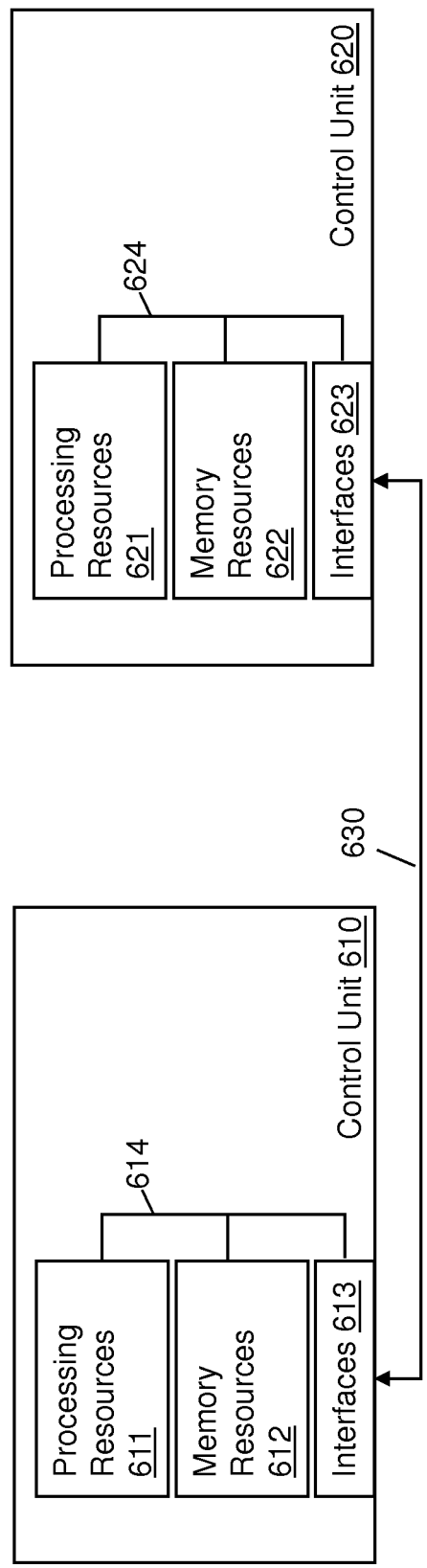
FIG. 6 shows a schematic block diagram illustrating a configuration of control units in which some embodiments are implementable.

Now reference is made to FIG. 6 for illustrating a simplified block diagram of various electronic devices that are suitable for use in practicing the example embodiments. FIG. 6 shows a control unit 610 comprising processing resources (processing circuitry) 611, memory resources (memory circuitry) 612 and interfaces (interface circuitry) 613, which are connected via a link 614.

According to some example implementations, the control unit 610 is configured to execute process 1 shown in FIG. 2A. According to some example implementations, the control unit 610 is part of and/or is used by at least one of the control plane network functions.

According to some example implementations, the control unit 610 is coupled to a control unit 620 via a link 630. The control unit 620 comprising processing resources (processing circuitry) 621, memory resources (memory circuitry) 622 and interfaces (interface circuitry) 623, which are connected via a link 624.

According to some example implementations, the control unit 620 is configured to execute process 2 shown in FIG. 2A. According to some example implementations, the control unit 620 is part of and/or is used by at least one of the user plane network functions.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, some example embodiments are implemented by computer software stored in the memory resources (memory circuitry) 612 and executable by the processing resources (processing circuitry) 611 of the control unit 610 and similar for the other memory resources (memory circuitry) 622 and processing resources (processing circuitry) 621 of the control unit 620, or by hardware, or by a combination of software and/or firmware and hardware in any or all of the devices shown. Further in this regard it should be noted that the various logical step descriptions above may represent program steps, or interconnected logic circuits, blocks and functions, or a combination of program steps and logic circuits, blocks and functions.

The memory resources (memory circuitry) 612, 622 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processing resources (processing circuitry) 611, 621 may be of any type suitable to the local technical environment, and may include one or more of general purpose computers, special purpose computers, microprocessors, digital signal processors (DSPs) and processors based on a multi core processor architecture, as non-limiting examples.

According to some embodiments it is possible to recognize that the AF or the HSS/UDM requested a change of a parameter in QoS/QCI, which is related to at least one of latency/delay, jitter and BER/PER. The network evaluates the parameter and takes an action to re-select the UPF in order to meet the new requirement not only during session establishment but also during an active session.

The third example embodiment possibly is slightly advantageous over the fourth example embodiment, since according to the third example embodiment the AMF/MMF is always responsible for re-selection of the SMF (and UPF) based on the receipt of the modification request, if the parameter has been changed compared to a former value of the parameter. The SMF can suppress any action on another parameter in the UPF, since the UPF might be re-located anyhow and the change of a subset of the QoS parameters is anyhow incomplete. However, in case the parameter has been changed, the modification procedure might be rejected and the re-location of the SMF/UPF needs to be initiated and performed by the AMF/SMF.

The fifth example embodiment is advantageous over the sixth example embodiment, since the AMF/MMF is always responsible for re-selection of the SMF (and UPF), if the parameter has been changed compared to a former value of the parameter. Therefore it is not required to send the reflective QoS to neighbor UPF/gNB as with the sixth example embodiment to notify the control plane of SMF, gNB to inform the AMF/MME to perform the re-selection of SMF/UPF.

The eighth example embodiment for the use case where the UE issues the reflective QoS shows that it is beneficial that the user plane UPF or gNB-U detects the change of the parameter and reports the complete QoS information to the control plane (SMF/gNB-C) from where the AMF is informed about the change in order to re-select the SMF/UPF.

The third and fourth example embodiments are equally beneficial for networks which may use QoS procedures and reflective QoS in parallel.

It is noted that 5G network functions names are just examples as the disclosure is applicable in general also for SGW-C/SGW-U and PGW-C/PGW-U in a 4G system and similar entities in a 3G system. MME may take over the function of the AMF in 5G.

It is further noted that the trigger issued by the PCF is just an example, and any other events being issued by the UDM, UE, etc. are equally applicable.

According to some embodiments, an apparatus for use on a control plane of a communication system is provided. According to an example implementation, the apparatus performs process 1 shown in FIG. 2A. In addition or in another example implementation, the apparatus comprises control unit 610 of FIG. 6.

The apparatus comprises means for receiving a parameter of service quality for a session between a user equipment and a data network, means for evaluating the parameter, and means for, based on the evaluation, initiating re-location of a user plane network function. For example, the apparatus comprises an AMF/MME or an SMF/SGW-C/PGW-C, initiating re-location of UPF(s)/SGW-U/PGW-U. As mentioned above, re-location of a user plane function also covers insertion of a (new) user plane function. That is, alternatively or in addition, the apparatus comprises means for inserting a new user plane network function.

According to an example implementation, the parameter of service quality comprises at least one of latency, jitter, bit error rate and packet error rate.

According to an example implementation, the means for initiating re-location of the user plane network function comprises means for re-selecting at least one user plane network function of a plurality of user plane network functions on a user plane of the communication system, that meets the parameter of service quality. As mentioned above, re-selecting at least one user plane network function of a plurality of user plane network functions on a user plane of the communication system also covers inserting at least one (new) user plane network function of a plurality of user plane network functions on a user plane of the communication system According to an example implementation, the means for initiating re-location and/or insertion of the user plane network function comprises means for re-selecting a control plane network function on the control plane, that is associated with the re-selected at least one user plane network function that meets the parameter of service quality.

According to an example implementation, the apparatus further comprises means for instructing the user plane network function to evaluate the parameter for a change, and report the change of the parameter to the control plane.

According to an example implementation, the means for instructing sends at least one of a first indication to report the change in the user plane and a second indication whether the change is to be reported in an uplink or downlink direction.

According to an example implementation, the apparatus further comprises means for instructing the user plane network function to reject the parameter and send a parameter rejection in the user plane.

According to an example implementation, the means for receiving receives the parameter of service quality from at least one element of the following group: an application function on the control plane, a policy control function on the control plane, a session management function on the control plane, a user equipment on the user plane, a user equipment on the control plane, an application on the user plane and the user plane network function on the user plane.

According to an example implementation, the means for receiving receives service quality information of the session, and the means for evaluating comprises means for detecting a change of the parameter from the service quality information received at consecutive events.

According to some embodiments, an apparatus for use in a communication system is provided. According to an example implementation, the apparatus performs process 2 shown in FIG. 2B. In addition or in another example implementation, the apparatus comprises control unit 620 of FIG. 6.

The apparatus comprises means for receiving a parameter of service quality for a session between a user equipment and a data network, means for evaluating the parameter for a change of the parameter, and means for, based on the evaluation, reporting the change of the parameter to a control plane of the communication system. For example, the apparatus comprises a PCF or a UPF.

According to an example implementation, the apparatus is for use on a user plane of the communication system, and further comprises means for receiving a first instruction from the control plane to evaluate the parameter for a change. For example, the apparatus comprises a UPF.

According to an example implementation, the means for reporting report the change in the user plane. In addition or alternatively, the means for reporting report the change in an uplink or downlink direction.

According to an example implementation, the apparatus further comprises means for, upon receiving a second instruction from the control plane by the means for receiving to reject the received parameter, sending a parameter rejection in the user plane in an uplink or downlink direction.

According to another example implementation, the apparatus is for use on the control plane of the communication system. For example, the apparatus comprises a PCF.

It is to be understood that the above description is illustrative and is not to be construed as limiting the disclosure. Various modifications and applications may occur to those skilled in the art without departing from the true spirit and scope of the disclosure as defined by the appended claims.

The invention claimed is:

1. A method, comprising:
receiving, at a session management function, a parameter of service quality for a session between a user equipment and a data network via a user plane of a communication system;
evaluating, at the session management function, the parameter; and
based on the evaluation, initiating, at the session management function, re-location of a user plane function on the user plane for the session,
wherein the initiating re-location of the user plane function comprises re-selecting, for the session, at least one user plane function of a plurality of user plane functions on the user plane of the communication system, that meets the parameter of service quality for the session, and
wherein the parameter of service quality comprises user plane latency for the session.

2. The method of claim 1, wherein the initiating re-location of the user plane function further comprises:
re-selecting a control plane network function on a control plane of the communication system, that is associated with the at least one user plane function for the session that meets the parameter of service quality.

3. The method of claim 1, comprising:
instructing the user plane function to evaluate the parameter for a change, and report the change of the parameter to a control plane of the communication system.

4. The method of claim 3, wherein the instructing comprises at least one of a first indication to report the change in the user plane or a second indication whether the change is to be reported in an uplink direction or downlink direction.

5. The method of claim 3, further comprising:
instructing the user plane function to reject the parameter and send a parameter rejection in the user plane.

6. The method of claim 1, the receiving comprising:
receiving the parameter of service quality from at least one of: an application function on the control plane or a policy control function on the control plane.

7. The method of claim 1, further comprising:
receiving service quality information for the session, and detecting a change of the parameter from the service quality information for the session.

8. A non-transitory computer-readable medium encoded with instructions that, when executed in hardware, performs a process, the process comprising:
receiving, at a session management function, a parameter of service quality for a session between a user equipment and a data network via a user plane of a communication system;
evaluating, at the session management function, the parameter; and
based on the evaluation, initiating, at the session management function, re-location of a user plane function on the user plane for the session,
wherein the initiating re-location of the user plane function comprises re-selecting, for the session, at least one user plane function of a plurality of user plane functions on the user plane of the communication system, that meets the parameter of service quality for the session, and
wherein the parameter of service quality comprises user plane latency for the session.

9. An apparatus, comprising:
at least one processor; and
at least one memory including computer program code of a session management function, the at least one memory and the computer program code configured to, with the at least one processor, cause the apparatus at least to perform:
receiving a parameter of service quality for a session between a user equipment and a data network via a user plane of a communication system;
evaluating the parameter; and
based on the evaluation, initiating re-location of a user plane function on the user plane for the session,
wherein the initiating re-location of the user plane function for the session comprises re-selecting at least one user plane function of a plurality of user plane functions on the user plane of the communication system, that meets the parameter of service quality for the session, and
wherein the parameter of service quality comprises user plane latency for the session.

10. The apparatus of claim 9, wherein the initiating re-location of the user plane function further comprises:
re-selecting a control plane network function on a control plane of the communication system, that is associated with the at least one user plane function for the session that meets the parameter of service quality.

11. The apparatus of claim 9, wherein the at least one memory and the computer program code are configured to, with the at least one processor, cause the apparatus to further perform:
instructing the user plane function to evaluate the parameter for a change, and report the change of the parameter to a control plane of the communication system.

12. The apparatus of claim 11, the instructing comprising at least one of a first indication to report the change in the user plane or a second indication whether the change is to be reported in an uplink direction or downlink direction.

13. The apparatus of claim 11, wherein the at least one memory and the computer program code are configured to, with the at least one processor, cause the apparatus to further perform:
   instructing the user plane function to reject the parameter and send a parameter rejection in the user plane.

* * * * *